United States Patent [19]

Hill et al.

[11] Patent Number: 4,910,078

[45] Date of Patent: Mar. 20, 1990

[54] LIGHT-STABLE MICROPOROUS COATINGS

[75] Inventors: Berlie R. Hill, Cana, Va.; Thomas F. Watson, Sr., Greensboro, N.C.

[73] Assignee: Burlington Industries, Inc., Greensboro, N.C.

[21] Appl. No.: 243,160

[22] Filed: Sep. 9, 1988

Related U.S. Application Data

[63] Continuation of Ser. No. 92,525, Sep. 3, 1987, abandoned.

[51] Int. Cl.$^4$ .............................................. B32B 27/00
[52] U.S. Cl. ..................................... 428/290; 427/246; 428/224; 428/260; 428/265; 428/289; 428/315.5; 428/423.1; 428/413
[58] Field of Search ............... 427/246; 428/224, 260, 428/289, 290, 265, 315.5, 423.1, 913

[56] References Cited

U.S. PATENT DOCUMENTS

| | | | |
|---|---|---|---|
| 3,360,394 | 12/1967 | Griffin et al. | 117/63 |
| 3,968,292 | 7/1976 | Pearman et al. | |
| 4,021,432 | 5/1977 | Holt et al. | 260/293.63 |
| 4,046,737 | 9/1977 | Holt et al. | 260/45.8 N |
| 4,049,647 | 9/1977 | Holt et al. | 542/426 |
| 4,137,360 | 1/1979 | Reischl | 428/310 |
| 4,374,888 | 2/1983 | Bornslaeger | 428/198 |
| 4,429,000 | 1/1984 | Naka et al. | 428/265 |
| 4,504,541 | 3/1985 | Yasuda et al. | |
| 4,507,407 | 3/1985 | Kluger et al. | 521/113 |
| 4,507,413 | 3/1985 | Thoma et al. | |
| 4,554,198 | 1/1985 | Von Blucher et al. | |
| 4,560,611 | 12/1985 | Naka et al. | 428/266 |
| 4,707,400 | 11/1987 | Towery | 428/265 |

FOREIGN PATENT DOCUMENTS

| | | |
|---|---|---|
| 0134635 | 3/1985 | European Pat. Off. |
| 0151963 | 8/1985 | European Pat. Off. |
| 58-169572 | 10/1983 | Japan. |
| 1455374 | 11/1976 | United Kingdom. |
| 1493823 | 10/1977 | United Kingdom. |

OTHER PUBLICATIONS

Ciba—Geigy Product Brochure Tinuvin® 292, Hindered Amine Light Stabilizer for Coatings, 1981.
Ciba—Geigy Product Brochure Tinuvin® 1130, Liquid UV—Absorber with High Performance.
Ciba—Geigy Product Brochure, Dyestuffs & Chemicals Division Technical Bulletin, Tinuvin® P Paste.
Ciba—Geigy Product Brochure, Tinuvin® 328, Ultraviolet Light Absorber for Plastics and Coatings.

*Primary Examiner*—James J. Bell
*Attorney, Agent, or Firm*—Nixon & Vanderhye

[57] ABSTRACT

Waterproof, moisture-vapor-permeable aromatic urethane-coated fabrics that resist degradation caused by ultraviolet light are prepared by incorporating hindered amine ultraviolet stabilizers into the aromatic urethane elastomer solvent solution that forms a microporous polyurethane layer by the wet coagulation method on a base fabric.

8 Claims, No Drawings

LIGHT-STABLE MICROPOROUS COATINGS

CROSS-REFERENCE TO RELATED APPLICATION

This is a continuation of earlier application Ser. No. 07/092,525 filed Sept. 3, 1987, now abandoned.

BACKGROUND OF THE INVENTION

This invention relates to protecting a moisture-preamble waterproof coated fabric from ultraviolet light deterioration as manifested by yellowing, loss or change of color, or loss of desirable mechanical properties. More particularly, it is concerned with a moisture permeable waterproof fabric having a microporous polymeric coating resistant to degradation caused by light. The coated fabric retains good moisture-permeability with durable waterproofness and other desirable properties that remain characteristic of the fabric even following multiple launderings. Procedures for making such fabrics are also described.

Coated fabrics suitable for use as activewear, rainwear and tentage function by blocking the pores of a woven, knitted or non-woven fabric with a cohesive polymer film which acts as a physical barrier against wind, water, and in the case of protective workwear, aggressive chemicals, oils, and greases. This barrier or coating distinguishes polymer coatings from chemical finishes which merely coat the individual fibers of a fabric without blocking the pores, and repel fluids by surface tension effects. Microporous coated fabrics repel water from the outside yet allow perspiration and moisture vapor to escape from the inside. Moisture is transmitted through a tortuous physical pathway produced in the cellular film or coating resulting from the art-recognized wet coagulation process, as described in more detail below. Polymeric coatings have initially been based upon rubber or synthetic or fluorocarbon rubbers, and more recently, polyurethanes, acrylics, silicone elastomers and polyvinylchlorides.

Fashion and leisurewear, particularly rainwear, require that the coated material be attractive with good drape and handle, be water repellent, although not necessarily for prolonged use in heavy rain, and that the fabric retain these properties after dry cleaning or laundering.

There are several fabrics available that satisfy the conflicting requirements of waterproofness and breathability. One example is Entrant, which is a woven nylon fabric coated with a microporous polyurethane film formed by the so-called wet coagulation technique as described in U.S. Pat. No. 4,429,000 to Toray Industries, Inc. Other polyurethane-coated fabrics are described in U.S. Pat. No. 3,360,394 to Griffin. In the wet coagulation method a thin, microporous polyurethane layer is formed on a base fabric by applying a coating solution of a polyurethane dissolved in a polar organic solvent that will solubilize the polyurethane yet is miscible with water. The polymer solution is applied to the fabric substrate by knife coating or the like, then immersed in a bath of water which selectively dissolves or mixes with the organic solvent, exchanges water for the polar solvent and causes the previously dissolved polyurethane to coagulate leaving a thin, microporous coating having a cellular substrate on the fabric. Surface pores that result are generally one micron or less in diameter. Such pores are small enough to exclude water droplets and yet they provide a tortuous physical pathway from the base fabric to the coating surface, leading to a water-vapor-permeable fabric. The coating is a thin polymeric (polyurethane) film.

Polymeric materials such as plastics, foams and fibers can be protected from deterioration caused by light by the use of either ultraviolet absorbers or ultraviolet light stabilizers. The deterioration is usually manifested by yellowing, loss or change of color, or loss of desirable mechanical properties. The commonly-used ultraviolet absorbers, or screening agents, are often benzophenone derivatives, such as 2-hydroxybenzophenone. These reagents absorb ultraviolet light and re-emit the energy at another less harmful wavelength, or as heat. They usually suffer some degradation in the process of saving the polymer from degradation.

The object of this invention is protect thin microporous polyurethane films from deterioration caused by ultraviolet light. Topical treatments are known to provide a modest degree of ultraviolet (UV) protection for coated fabrics. These treatments are water-based in nature, and must be applied as a final finish by a final pad, dry, cure procedure. With most coated fabrics, this approach works, but with a microporous coating having a cell structure of many voids or micropores generally one micron or smaller in diameter, the pores are small enough to exclude liquid water. The UV-protective treatment therefore cannot penetrate the inner structure of the coating's matrix, leaving it unprotected, and it will yellow with aging or exposure to light.

Ultraviolet light stabilizers, of which hindered amine light stabilizers are a class, do not function by the typical mechanism of ultraviolet absorption, but rather interrupt the decomposition mechanism initiated by ultraviolet light. Tinuvin ® 292 (registered trademark of Ciba-Geigy Corp, Ardsley, N.Y.), the stabilizer of choice in the present invention, is a hindered amine light stabilizer. Its structure and formula are given in the explanation of the invention that follows. Applicants have found that this product provides effective protection against ultraviolet light for 20 hours in AATCC Test Method 16A-1982. This is the level of protection required by the marketplace for apparel end uses. As shown by Table I, several ultraviolet absorbers were ineffective in providing the desired degree of protection. Our experience indicates that an ultraviolet light stabilizer, rather than an ultraviolet absorber, is required for use in microporous urethane foams.

Microporous coatings, as described above and elsewhere, are made by dissolving a polymer in a water-miscible solvent, then mechanically applying this solvent solution as a coating to a fabric. The thus-coated fabric is then immersed in a non-solvent, such as water. The microporous structure of the coating is completed when all the solvent has been displaced with the non-solvent, leaving a microporous layer on the base fabric.

Experience has made it clear that unprotected microporous coatings using aromatic polyester-based urethanes dissolved in N,N-dimethylformamide (DMF) have a severe light fastness problem and will not meet the apparel industry standard of effective protection against ultraviolet light for 20 hours.

DETAILED DESCRIPTION OF THE INVENTION

Disclosed is a process for preparing a waterproof, water-vapor-permeable ultraviolet light protected coated fabric, exhibiting a good hydrostatic pressure resistance, formed in a rapid and reproducible manner by coagulation from a solvent solution of a polyurethane elastomer containing a hindered amine ultraviolet light stabilizer. The fabric is coated using the wet coagulation method in which a polymeric elastomer or mixture of polymeric elastomers is dissolved in a water-miscible polar organic solvent. The polymer solution, to which from 0.1% to 1% by weight of the hindered amine ultraviolet light stabilizer is added, is coated onto a base fabric and then immersed in a coagulation water bath. The water extracts the polar organic solvent, which is itself water-miscible, from the coating, leaving a porous, spongy polyurethane matrix having the specified porosity and other properties, as well as the ultraviolet stabilizer on the base fabric. Washing to remove any unextracted polar organic solvent and drying follow. Optionally, a water repellent fluorocarbon finish, or a second ultraviolet light stabilizer is later applied.

A convenient thickener system based on acrylic acid polymers that are compatible with the solvent/polyurethane system and soluble in the solvent may be used to control and adjust coating solution viscosity which, in turn, leads to thin, flexible polyurethane elastomer coatings having the optimum performance and customer acceptance properties. The thickener system is described in detail in copending, commonly assigned application Ser. No. 903,130 filed Sept. 3, 1986. The polyurethane elastomer coating may also contain an antimicrobial agent as described in commonly assigned application Ser. No. 905,135 filed Sept. 9, 1986 by Hill et al. The disclosures of these two applications are hereby incorporated by reference.

The coating solutions of the present invention are based upon urethane resins dissolved in a water miscible, polar organic solvent. The type of urethane resin systems and components contained in the coating prior to or after coagulation may vary widely. Several such systems are disclosed in the art, for instance in U.S. Pat. No. 4,429,000 and elsewhere. The following is a preferred system. A preferred series of polyurethane resins are Texthane 620C and 420C available from Morton Chemical division of Morton Thiokol. These are aromatic polyester urethane resins, 620C characterized as a soft resin and 420C as a firm resin; both resins are sold as dimethylformamide solutions.

Other components of the preferred coating compositions include nonionic surfactants. The water-miscible polar organic solvent of choice is N,N-dimethylformamide, commonly referred to as DMF (CAS registry number 68-12-2), although other compatible solvents such as dimethylacetamide or dimethylsulfoxide may be considered.

Typical urethane-based water-coagulable coating compositions are as follows:

| Urethane resin(s) | Up to | 48% |
| Nonionic surfactant(s) | Up to | 8% |
| Water | Up to | 6% |
| Ultraviolet light stabilizer | | 0.1 to 1% |
| Water-miscible polar organic solvent | Balance | |

It will be understood that the coating composition may contain coating additives and adjuvants, such as a pigment or colorant, water repellent, antistat, antimicrobial, flame retardant, etc. Alternatively, any or all of these may be applied to the fabric as an aftertreatment following formation of the microporous layer.

The ultraviolet screening agent used in the present invention is a hindered amine ultraviolet light stabilizer, preferably a bis(polyalkyl-4-piperidinyl) sebacate, and most preferably bis(1,2,2,6,6-pentamethyl-4-piperidinyl)sebacate. The amount of ultraviolet light stabilizer included in the aromatic urethane coating composition is at least sufficient to provide the degree of light protection required for the specific end use of the coated fabric although excessive quantities will be avoided for economic reasons. An amount of active material in the coating mixture ranging from 0.1% to about 1% will provide a degree of protection sufficient to satisfy AATCC standard 16A-1982.

Following formation of the ultraviolet screening agent-containing microporous film, the fabric may be finished with a top coat of an additional quantity of the same or a compatible ultraviolet screening agent to further enhance protection to degradation caused by ultraviolet light.

The coating formulation is prepared as follows: the urethane resin or mixture of resins is preweighed into a container. Water, the polar organic solvent, usually DMF, the surfactant, and the hindered amine-type ultraviolet light stabilizer are preweighed into a separate container and mixed thoroughly. Other components of the type described above may be included. The water/solvent mixture is then added to the urethane under agitation. The optimum procedure for mixing of ingredients and order of mixing will be determined through a brief series of small-scale experiments, care being taken to avoid premature coagulation of the coating solution.

Once the coating solution is prepared, the urethane coating is applied to any textile substrate capable of supporting the liquid film by any conventional coating method appropriate for use in the wet coagulation method. The coated fabric is then dipped in a coagulation bath consisting of water, or water and an additive to alter or adjust coagulation, e.g., DMF, a surfactant, etc. During the coagulation step, the majority of the DMF in the DMF/urethane film migrates into the coagulation bath and is replaced by water, generating a coherent, tenacious, microporous, spongy film on the fabric surface. After additional washing to remove any remaining DMF, the fabric is dried and optionally given a water repellent finish.

The invention will be further explained with reference to the following examples in which all parts and percentages are by weight unless otherwise indicated.

EXAMPLE 1

A coating mixture was prepared containing two urethane resins, a nonionic surfactant, an ultraviolet light stabilizer and other diluents according to the mixing instructions given above and having the following formulation:

| | amount (wt %) |
|---|---|
| urethane resin (Texthane 620-C) | 29.7 |
| urethane resin (Texthane 420-C) | 25.4 |
| nonionic surfactant (Pluronic L-35) | 2.0 |
| ultraviolet light stabilizer (Tinuvin ® 292) | 0.4 |
| DMF | 40.9 |

| -continued | |
|---|---|
| | amount (wt %) |
| water | 2.0 |

The solution was coated onto a 100% polyester woven fabric and coagulated using the wet coagulation process, then rinsed to remove any remaining DMF, and then dried.

The resulting coated fabric was exposed for 20 hours in a Fade-Ometer according to AATCC Test Method 16A-1982 to assess the level of protection afforded by the ultraviolet stabilizer. No appreciable change in color was observed after 20 hours, indicating that the fabric achieves the level of protection required by the marketplace for apparel end uses.

EXAMPLE 2

Samples of thin, microporous films of aromatic urethane were prepared in the manner of Example 1, using several commercially available ultraviolet light stabilizers as identified below in the amounts the coating composition as indicated. Samples were exposed for 20 hours to a carbon-arc lamp, according to AATCC Test Method 16A-1982. Each sample was evaluated for yellowing, and the results are as follows:

TABLE I
EFFECTS OF ADDITIVES ON LIGHT-STABILITY OF MICROPOROUS COATINGS

| Product | Chemical Type | % in Coating | Yellowing |
|---|---|---|---|
| Tinuvin ® 328 | Benzotriazole (a) | 0.2 | Appreciable change |
| | | .4 | Appreciable change |
| | | .6 | Appreciable change |
| Tinuvin ® P | Benzotriazole (b) | .05 | Appreciable change |
| | | .1 | Appreciable change |
| | | .2 | Appreciable change |
| | | .4 | Appreciable change |

The preferred ultraviolet light stabilizer, bis(1,2,2,6,6-pentamethyl-4-piperidinyl)sebacate, which is the subject of various patents to Ciba-Geigy and commercially available as Tinuvin ® 292, is described by the supplier in sales literature as useful with urethanes specifically in stabilizing "thermoplastic urethane" and "moisture cured urethane", but it does not mention microporous urethanes of the type disclosed in the present application. Thin, microporous films of aromatic urethane are very difficult to protect, since they are not self-protected by a thick layer of the material itself. As shown by Table I, several commercial products from which the skilled person may select, fail to yield the required level of protection, although Tinuvin ® 328, a benzotriazole, is recommended for protecting thermoplastic, moisture cured and two-component urethanes against attack by ultraviolet light.

The successful ultraviolet stabilizer must satisfy several requirements to be compatible with the requirements of the wet coagulation process. The product must be soluble in solvents such as DMF, insoluble in water, and capable of providing a high level of protection from ultraviolet light. Of the commercially available products examined for this purpose, Tinuvin ® 292 was unique.

It is more difficult to use aliphatic urethanes (which have better inherent resistance to ultraviolet light) than aromatic products, because the aliphatic urethanes do not coagulate as well. In addition, they are more expensive than the aromatics. The aromatic products, however, require an effective light stabilizer capable of providing 20 hours of protection in the standard AATCC test. The use of this particular ultraviolet stabilizer is indeed unique and highly effective in stabilizing thin, microporous films of aromatic urethane.

Coated fabrics having a thin, microporous aromatic urethane coating are resistant to degradation from ultraviolet light for at least 20 hours according to AATCC Test Method 16A-1982. Preferably, the resulting coated fabrics also have a moisture-vapor transmission of at least 800g/m$^2$/24 hours and a hydrostatic pressure resistance of at least 10 psi.

What is claimed:

1. A process of protecting a waterproof, water-vapor-permeable, coated fabric from ultraviolet light degradation, the coated fabric having a microporous polyurethane layer thereon formed by the wet coagulation method, said process comprising applying a water-miscible, polar organic solvent coating solution of an aromatic urethane elastomer to a base fabric, immersing the thus-coated base fabric into an aqueous coagulation bath to extract the solvent from the polymer solution leaving a porous aromamic urethane matrix adhered to the base fabric, then washing and drying the coated fabric, wherein the polyurethane elastomer solution contains an ultraviolet light protecting amount of hindered amine ultraviolet light stabilizer.

2. The process of claim 1 in which from about 0.1 to about 1.0 weight percent of the ultraviolet light stabilizer is present in the coating solution.

3. The process of claim 2 in which the amount of ultraviolet light stabilizer is in the range of from 0.1% to about 0.5%.

4. The process of claim 1, in which the amount of the ultraviolet light stabilizer included in the coating solution provides effective protection against ultraviolet light for 20 hours in AATCC Test Method 16A-1982.

5. The process of claim 1 in which the ultraviolet light stabilizer is bis(1,2,2,6,6-pentamethyl-4-piperidinyl)sebacate.

6. A waterproof, water-vapor-permeable, ultraviolet light-resistant coated fabric produced by the process of claim 1.

7. A coated fabric having a thin, microporous aromatic urethane coating thereon resistant to degradation from ultraviolet light for at least 20 hours according to AATCC Test Method 16A-1982.

8. A coated fabric with a thin, ultraviolet light-resistant microporous aromatic urethane coating thereon having a moisture-vapor transmission of at least 800g/m$^2$/24 hours, a hydrostatic pressure resistance of at least 10 psi and resistance to ultraviolet light for at least 20 hours according to AATCC Test Method 16A-1982.

* * * * *

UNITED STATES PATENT AND TRADEMARK OFFICE
CERTIFICATE OF CORRECTION

PATENT NO. : 4,910,078
DATED : March 20, 1990
INVENTOR(S) : Berlie R. Hill, et al.

It is certified that error appears in the above-identified patent and that said Letters Patent is hereby corrected as shown below:

Column 1, line 11, the word "preamble" should read --permeable--.
Column 3, line 43, the word "polyeste.r" should read --polyester--.

Column 5, line 22, the word --in-- should be inserted between the words "amounts" and "the".
Column 5, TABLE I, eight lines are missing. The omitted lines are as follows:

| | | | |
|---|---|---|---|
| Tinuvin® 1130 | Benzotriazole (c) | .4 | Appreciable change |
| Tinuvin® 1130 | Benzotriazole } | .2 | No appreciable |
| Tinuvin® 292 | Hindered amine (d)} | .2 | change |
| Tinuvin® 292 | Hindered amine | .4 | No appreciable change |

(a) 2[2'-hydroxy-3,5'-bis(2-methyl-2-butyl)phenyl]benzotriazole
(b) 2(2'-hydroxy-5-methylphenyl)benzotriazole
(c) Specific structure not available
(d) Bis(1,2,2,6,6-pentamethyl-4-piperidinyl)sebacate Signed and Sealed this Twenty-fifth Day of February, 1992

Attest:

HARRY F. MANBECK, JR.

*Attesting Officer*    *Commissioner of Patents and Trademarks*